United States Patent

[11] 3,626,052

| [72] | Inventors | Nicholas A. Sisco<br>96 Loker St., Wayland, Mass. 01778;<br>Andrew J. Kelly, 32 Vogel St., West<br>Roxbury, Mass. 02132 |
|---|---|---|
| [21] | Appl. No. | 836,167 |
| [22] | Filed | June 24, 1969 |
| [45] | Patented | Dec. 7, 1971 |

[54] POLYISOPRENE-NEOPRENE METEOROLOGICAL BALLOONS
9 Claims, No Drawings

[52] U.S. Cl. .................................................. 264/301,
244/31, 260/29.7 D, 260/316, 260/31.8, 260/890,
264/301
[51] Int. Cl. .................................................. B64b 1/40
[50] Field of Search ................................................ 244/31;
260/890, 29.7 D, 890, 301

[56] References Cited
UNITED STATES PATENTS

| 2,461,072 | 2/1949 | Miller .......................... | 244/31 |
|---|---|---|---|
| 2,502,353 | 3/1950 | Sullivan ........................ | 260/890 |
| 2,511,113 | 6/1950 | La Piana et al. ............... | 260/890 |
| 2,514,194 | 7/1950 | Cline ............................ | 260/890 |
| 2,553,651 | 5/1951 | Gessler ......................... | 260/890 |
| 2,588,993 | 3/1952 | Schroeder .................... | 260/890 |
| 2,614,094 | 10/1952 | Wheelock ..................... | 260/890 |
| 2,646,370 | 7/1953 | Nelson ......................... | 244/31 |
| 2,815,957 | 12/1957 | Semegen ....................... | 260/890 |
| 3,062,696 | 11/1962 | Riehl ............................ | 260/890 |
| 3,326,824 | 6/1967 | Graham......................... | 260/890 |
| 3,405,886 | 10/1968 | Gosnell et al. ................ | 244/31 |
| 3,415,767 | 12/1968 | Kelly ............................ | 244/31 |
| 3,475,201 | 10/1969 | Hundt et al. .................. | 244/31 |

*Primary Examiner*—Julius Frome
*Assistant Examiner*—A. H. Koeckert
*Attorneys*—Metro Kalimon, William L. Baker and C. E. Parker ABSTRACT: A polyisoprene-neoprene latex in combination with a plasticizer is used to fabricate meteorological balloons.

POLYISOPRENE-NEOPRENE METEOROLOGICAL BALLOONS

The present invention relates to the preparation of film-forming latices, and more specifically to a plasticizer-containing polyisoprene-neoprene latex which is particularly suitable for the fabrication of balloons.

Balloons of relatively large size which are suitable for carrying weather instruments aloft have been prepared from both natural and synthetic rubber latices. In recent years neoprene, because of its inherent stability and desirable processing qualities, has found extensive use in the fabrication of balloon films. However, neoprene, when subjected to low temperatures at high altitudes has a tendency to lose its plasticity, and premature rupture of a balloon fabricated therefrom is likely to occur.

To overcome the problems encountered with neoprene films at low temperature, a technique of post plasticizing cured balloons has been developed. Post plasticizing, which involves imbibing an organic plasticizing agent, such as a dialkyl phthalate, into a finished cured balloon structure is expensive and time consuming. Attempts to incorporate plasticizers into neoprene-type latices used for balloon construction have been unsuccessful in that preplasticized latex compositions frequently do not produce films having the desired physical properties.

It is, therefore, an object of the present invention to provide an improved plasticizer containing neoprene-type latex which is suitable for the construction of balloons.

It is another object to provide a plasticized low cost neoprene-containing latex which will yield plasticized films having the physical properties necessary to successful manufacture of balloons.

These and still further objects of the present invention will become readily apparent to one skilled in the art from the following detailed description and specific examples.

Broadly, this invention contemplates use of a polyisoprene-neoprene latex which contains plasticizing amounts of a compatible plasticizer which will yield films having the physical properties necessary for the construction of balloons.

More specifically, it has been found that a latex composition particularly suitable for the preparation of high altitude balloons contains 100 parts by weight of combined polyisoprene-neoprene solids. The solids mixture is composed of 30 to 70 parts by weight of polyisoprene and 30 to 70 parts by weight of neoprene, the amount of the two elastomers being 100 parts by weight of solids. Excellent balloons are prepared when the mixture is composed of 50 parts of polyisoprene and 50 parts of neoprene. The plasticizer is present in amount ranging between 4 and 25 parts by weight based on the weight of the combined elastomers.

The polyisoprene incorporated in the finished latex composition is commercially obtained in the form of a preformed latex which contains from about 40 to about 65 percent by weight solids. Polyisoprene contained in these compositions has a molecular weight of 80,000 and greater. Typical commercially available polyisoprene latex compositions which may be utilized in preparing the present composition are generally prepared from linear polymerized isoprene having a molecular weight of greater than about 80,000. This linear polyisoprene is obtained by polymerizing isoprene in an organic solvent in the presence of a Ziegler catalyst. The polyisoprene is dried and then dissolved in an organic solvent. The resulting solution is then combined with a fatty acid, such as oleic acid, and dispersed in water which contains sufficient potassium hydroxide to yield a pH of about 12. The resultant polyisoprene emulsion is then suitable for incorporation into the compositions contemplated herein. A commercially available polyisoprene latex suitable for use herein is polyisoprene latex Type IR 700 from Shell Chemical Co.

The neoprene component used in preparing the present compositions is commercially obtained in the form of a preformed latex composition and contains from about 45 to about 55 percent by weight neoprene polymer as solids.

The neoprene latex used herein is prepared by the conventional emulsion polymerization of chloroprene (2-chloro,1,3 butadiene). In a typical preparation, chloroprene monomer is combined with a fatty acid (preferably rosin acids) and a catalyst. The mixture is dispersed with high speed mixing into an aqueous solution of alkali metal hydroxide having a pH of 10.5 to 13.0. Polymerization of the dispersed monomer is initiated by heating and continued until a desired molecular weight greater than about 100,000 is attained.

Typical commercially available neoprene latices which may be utilized are neoprene latex Types 571, 735 and 750, which are sold by the Dupont Co. and described in Neoprene Latex, J. C. Carl, (1962).

As indicated above, the present compositions contain sufficient plasticizer to impart desirable physical characteristics to films prepared therefrom. The function of the plasticizer is primarily to impart sufficient plasticity to the finished films so as to render them elastic at the temperatures encountered during use. Typical liquid, nonvolatile plasticizers which may be utilized in the preparation of the present composition include dialkyl phthalates, e.g., dibutyl and dioctyl phthalates; dialkyl esters of alkane dicarboxylic acids, e.g., dioctyl adipate, dioctyl sebacate and dibutyl sebacate; alkylene glycol derivatives, e.g., triethylene glycol di(2-ethyl hexoate), dipropylene glycol dibenzoate, and ethylene glycol monobutyl ether oleate, and lower alkyl esters of unsaturated monocarboxylic acids, e.g., butyl oleate.

The latex compositions contemplated in the present invention consist primarily of polyisoprene-neoprene latex in combination with a plasticizer. However, in addition to these basic ingredients, other components including stabilizers, anti-oxidants, curing agents, and fillers generally incorporated in latex compositions are used in the preparation of balloon films. Typical stabilizers include alkyl aryl sulfonates such as nonyl benzyl sulfonate and sodium salts of sulfated methyl oleate. Antioxidants which are used to prevent subsequent deterioration of the formed balloon films include N-phenyl-beta-naphthylamine and dibetanaphthyl-p-phenylene diamine. The present compositions include curing agents which are used to promote cross-linking during the final fabrication steps of the balloon structure. Typical curing agents include zinc oxide and sulfur.

The latex compositions may include certain amounts of fillers or pigments which are generally finely divided solids such as kaolin and whiting.

The amounts of stabilizer, antioxidant curing agents, and fillers used in the formation of the present latex compositions vary widely according to the specific type of additive used. However, in typical formulations, the following percentages by weight (dry basis) are effective in the latex composition.

| Additive | Percent by Weight (dry basis) |
| --- | --- |
| Antioxidant | ½ to 3 |
| Curing agent | ¼ to 6 |
| Stabilizer | 0 to 3 |
| Filler | 0 to 30 |

The latices prepared in accordance with the present invention will generally contain from about 40 to 60 percent by weight solids, the remainder being primarily water and minor amounts of organic solvents or dispersing agents. These latex compositions remain stable over substantial periods of storage at room temperature, that is, they do not tend to segregate or polymerize when in storage or in use for periods ranging from about 0 to 30 days.

To prepare the latex compositions, the order of combining the individual ingredients is not particularly significant. Preferably, the polyisoprene component in emulsion form is first combined with the neoprene emulsion to form a homogeneous mixture. Subsequently, the plasticizer which has been first emulsified in a sufficient amount of water and added to the overall composition under conditions of vigorous agitation. Subsequently, the desired amounts of stabilizer, antioxidant, curing agent and filler may be added and the entire composition agitated until a uniform blend is obtained.

Under normal conditions the mixing operation may be conducted at room temperature, however, at times heating to temperatures on the order of 30° to 95° C. may be desirable.

When the present latex compositions are used in the preparation of balloon structures, conventional balloon fabrication procedures are followed. These involve coating a mold with a coagulating agent, such as calcium nitrate dissolved in water, dipping the coated mold into the latex composition to form a gel film of desired thickness. The film is subsequently stripped therefrom and inflated to the desired diameter. The inflated structure is then dried, deflated and cured at a temperature of from about 210° to about 280° F.

Balloons prepared in accordance with the present invention possess a weight of from about 100 to about 10,000 grams. The diameter of these balloons when inflated at sea level will range from about 2 to about 15 feet and the thickness of the films at these diameters will range from about 3 to about 7 mils. The balloons prepared from the present latex compositions will readily achieve an altitude of about 20,000 to about 130,000 feet depending on original size. It is found that the present plasticized balloons when subjected to temperatures to −70° F. will retain sufficient elasticity to permit full expansion at these temperatures. The present balloons will yield ascent rates ranging from about 950 to about 1060 feet per second.

Having described the basic aspects of the present invention, the following specific examples illustrate typical procedures used in the practice of the present invention.

EXAMPLE I

A latex composition was prepared by combining the following ingredients:

| Ingredient | Parts by Weight (dry basis) |
| --- | --- |
| Polyisoprene latex (Shell IR–700) | 50.0 |
| Neoprene latex (Dupont N–750) | 50.0 |
| Sodium salt of sulfated methyl oleate | 1.5 |
| Heptaldehyde-aniline reaction product | 0.25 |
| Zinc dibenzyl dithiocarbamate | 0.25 |
| Zinc oxide | 2.0 |
| Sulfur | 1.0 |
| N-phenyl-beta-naphthylamine | 2.0 |
| Dibutyl ammonium oleate | 0.75 |
| Ethylene glycol monobutyl ether oleate | 15.0 |

The above ingredients were combined by first admixing the two latices. Then the ethylene glycol monobutyl ether oleate (as a 60 percent emulsion in water) was added slowly, followed by the addition of the heptaldehyde-aniline reaction product (as a 30 percent emulsion in water). The sodium salt of sulfated methyl oleate and dibutyl ammonium oleate were then added. Finally, a finely ground dispersion in water of the following ingredients was added slowly:

Zinc oxide
Sulfur
N-phenyl-beta-naphthylamine
Zinc dibenzyl dithiocarbamate

EXAMPLE II the latex composition of example I was formed into balloons using the following procedure.

Fluted balloon molds having an effective diameter of about 18 inches were dipped into a tank containing the latex composition. The molds were first coated with calcium nitrate in water to serve as a coagulant. A gel coat of about 40 mils thickness was formed on the molds within a period of about 25 minutes. The molds were removed from the latex tank and the gel films were stripped from the molds and subsequently inflated to diameters of about 6 feet and permitted to dry in the inflated state at a temperature of about 100° F. for about 50 minutes. The balloons were subsequently deflated and cured in an oven maintained at a temperature of about 230° F.

EXAMPLE III

The flying qualities of the balloons prepared in example II were determined by the following procedure. The balloons which weight about 1200 grams were first inflated to a diameter of about 6 feet with helium whereupon it was found that the balloons were capable of supporting a weight of about 6½ pounds. The balloons were subsequently released and ascent rates varying from 950 to 1060 per second were observed. In a sample testing which comprised five balloons all the balloons were observed to achieve an average altitude of 122,000 feet.

EXAMPLE IV

Example I was duplicated except that 17–½ parts by weight of butyl oleate was substituted as the plasticizer for the ethylene glycol monobutyl ether oleate. Balloons prepared from this composition performed equally as well as those tested according to the procedure described in example III.

The above examples clearly illustrate that balloons having superior flight characteristics may be readily prepared from the isoprene-neoprene plasticized latex compositions disclosed herein.

We claim:

1. A meteorological balloon comprising a hollow elastomeric film structure adapted for inflation, said film being comprised of (a) a mixture of from 30 to 70 parts by weight of polymerized isoprene and from 30 to 70 parts by weight of polymerized chloroprene, the amount of the two being equal to 100 parts and (b) a plasticizer which is compatible with said mixture of polymerized isoprene and polymerized chloroprene, said plasticizer being present in an amount which is at least sufficient to render said mixture elastic at the temperature encountered during use of the balloon.

2. The balloon of claim 1 wherein said mixture is composed of 50 parts by weight of said polymerized isoprene and 50 parts by weight of said polymerized chloroprene.

3. The balloon of claim 1 wherein said plasticizer is selected from the group consisting of dialkyl phthalates, dialkyl esters of alkane dicarboxylic acids, alkylene glycol derivatives and alkyl esters of unsaturated monocarboxylic acids.

4. A meteorological balloon comprising a hollow elastomeric film structure adapted for inflation, said film being comprised of cured polymeric particles deposited from an aqueous latex containing (a) a mixture of from 30 to 70 parts by weight of polymerized isoprene with from 30 to 70 parts by weight of polymerized chloroprene, the amount of the two being equal to 100 parts, and (b) a liquid nonvolatile plasticizer compatible with said mixture, said plasticizer being selected from the group consisting of dialkyl phthalates, dialkyl esters of alkane dicarboxylic acids, alkylene glycol derivatives and alkyl esters of unsaturated monocarboxylic acids, said plasticizer being present in an amount of about 4 to 25 parts by weight, based on the combined weight of said polymerized isoprene and said polymerized chloroprene.

5. The balloon of claim 4 having a weight of between about 100 to 10,000 grams.

6. The balloon of claim 4 wherein the plasticizer is ethylene glycol monobutyl ether oleate.

7. The balloon of claim 4 wherein the plasticizer is butyl oleate.

8. The method of preparing a meteorological balloon which comprises forming an aqueous latex containing (a) a mixture of from 30–70 parts by weight of polymerized isoprene with from 30–70 parts by weight of polymerized chloroprene, the total amount of said polymerized isoprene and polymerized chloroprene being equal to 100 parts, and (b) between about 4 to 25 parts by weight, based on the combined weight of said polymerized isoprene and said polymerized chloroprene, of a liquid nonvolatile plasticizer, immersing a mold having the desired balloon configuration into said aqueous latex, coagulating the latex to form a film on said mold, removing said mold from said aqueous latex and subsequent curing said coagulated film.

9. The method of preparing a meteorological balloon which comprises the steps of forming an aqueous latex containing (a) a mixture of from 30–70 parts by weight of polymerized isoprene with from 30–70 parts by weight of polymerized chloroprene, the total amount of said polymerized isoprene and polymerized chloroprene equaling 100 parts, and (b) from 4–25 parts by weight, based on the combined weight of said polymerized isoprene and polymerized chloroprene, of a plasticizer selected from the group consisting of dialkyl phthalates, dialkyl esters of alkane dicarboxylic acids, alkylene glycol derivatives and alkyl esters of unsaturated monocarboxylic acids, immersing a mold having the desired balloon configuration in said aqueous latex and coagulating the latex to form a film of said latex on said mold, removing said film from said mold and thereafter curing said film by heating to an elevated temperature.

* * * * *